(12) United States Patent
Lee et al.

(10) Patent No.: US 8,531,629 B2
(45) Date of Patent: Sep. 10, 2013

(54) REFLECTIVE DISPLAY DEVICE INCLUDING POLYMER-DISPERSED LIQUID CRYSTALS HAVING PARTICULAR LIGHT-ABSORBING MEMBER

(75) Inventors: Gae-hwang Lee, Hwaseong-si (KR); Kyu-young Hwang, Ansan-si (KR); Jae-eun Jung, Seoul (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 185 days.

(21) Appl. No.: 13/224,861

(22) Filed: Sep. 2, 2011

(65) Prior Publication Data

US 2012/0262649 A1  Oct. 18, 2012

(30) Foreign Application Priority Data

Apr. 13, 2011  (KR) .................. 10-2011-0034417

(51) Int. Cl.
*G02F 1/1333* (2006.01)
*G02F 1/1335* (2006.01)

(52) U.S. Cl.
USPC ............. 349/86; 349/88; 349/113; 349/14; 349/106

(58) Field of Classification Search
USPC ................. 349/86, 88, 113, 114, 106
See application file for complete search history.

(56) References Cited

U.S. PATENT DOCUMENTS

| 5,737,050 A * | 4/1998 | Takahara et al. ............ 349/122 |
| 6,285,425 B1 * | 9/2001 | Akins et al. ................. 349/113 |
| 2012/0113360 A1 * | 5/2012 | Lee et al. ..................... 349/86 |

FOREIGN PATENT DOCUMENTS

| JP | 2005010481 A | 1/2005 |
| JP | 2008096939 A | 4/2008 |
| KR | 20100042038 A | 4/2010 |
| KR | 20100132309 A | 12/2010 |

\* cited by examiner

*Primary Examiner* — Mike Qi
(74) *Attorney, Agent, or Firm* — Harness, Dickey & Pierce, P.L.C.

(57) ABSTRACT

According to example embodiments, a reflective display device includes a plurality of pixel units. Each of the plurality of pixel units may include a reflective plate having at least one concave reflective surface, a first electrode on the reflective plate, a second electrode separate from the first electrode, at least one light-absorbing member corresponding to the at least one concave reflective surface, and a polymer dispersed liquid crystal PDLC layer between the first electrode and the second electrode. The PDLC layer includes a polymer and liquid crystals. The light-absorbing member may be at a focus position of the at least one concave reflective surface.

32 Claims, 7 Drawing Sheets

REFLECTIVE DISPLAY DEVICE INCLUDING POLYMER-DISPERSED LIQUID CRYSTALS HAVING PARTICULAR LIGHT-ABSORBING MEMBER

CROSS-REFERENCE TO RELATED APPLICATIONS

This application claims priority under 35 U.S.C. §119 to the benefit of Korean Patent Application No. 10-2011-0034417, filed on Apr. 13, 2011, in the Korean Intellectual Property Office, the disclosure of which is incorporated herein in its entirety by reference.

BACKGROUND

1. Field

Example embodiments relate to a display device, and more particularly, to a reflective display device including polymer-dispersed liquid crystals (PDLCs).

2. Description of the Related Art

Devices using polymer-dispersed liquid crystals (PDLCs) may have a structure in which polymers and liquid crystals are uniformly distributed, and when an electric field is applied to the PDLCs, optical refractive indexes of the polymers and the liquid crystals are changed. In more detail, when the electric field is not applied to the PDLCs, liquid crystal molecules may be randomly oriented, and light incident on the PDLCs is scattered due to a difference between a refractive index of the polymers and a refractive index of the liquid crystals. However, when the electric field is applied to the PDLCs, the liquid crystal molecules may be arrayed in parallel with the electric field, and light incident on the PDLCs passes through the PDLCs due to a match between the refractive index of the polymers and the refractive index of the liquid crystals. In this manner, the PDLCs may scatter or transmit light by adjusting the difference between the refractive index of the polymers and the refractive index of the liquid crystals by applying an electric field applied thereto. Thus, the PDLCs may be usefully applied to a reflective display device that displays information or an image by using an external light source.

An absorption plate for absorbing light that passes through the PDLCs may be used in the reflective display device including the PDLCs. However, in the reflective display device using the absorption plate, light that is scattered from the PDLCs and then is incident on the absorption plate is dissipated such that a reflection efficiency deteriorates. In order to reduce the deterioration of the reflection efficiency, a specular plate may be used to specularly reflect light that passes through the PDLCs. However, in a case of using the specular plate, if a viewer is positioned at an angle at which incident light is specularly reflected, visibility of the reflective display device considerably deteriorates.

SUMMARY

Example embodiments relate to a reflective display device including polymer-dispersed liquid crystals (PDLCs).

Additional aspects will be set forth in part in the description which follows and, in part, will be apparent from the description, or may be learned by practice of example embodiments.

According to example embodiments, a reflective display device includes a plurality of pixel units. Each of the plurality of pixel units may include a reflective plate including at least one concave reflective surface, a first electrode on the reflective plate; a second electrode separate from the first electrode, and at least one light-absorbing member, and a polymer-dispersed liquid crystal (PDLC) layer. The light-absorbing member may correspond to the at least one concave reflective surface. The light-absorbing member may be at a focus position of the at least one concave reflective surface. The polymer-dispersed liquid crystal (PDLC) layer may be between the first electrode and the second electrode. The polymer-dispersed liquid crystal (PDLC) layer may include a polymer and liquid crystals.

The at least one concave reflective surface may include one of an elliptic paraboloid shape and a half-spherical shape. Also, the at least one concave reflective surface may include a half-cylindrical shape, and the at least one light-absorbing member may be parallel with the at least one concave reflective surface at the focus position of the at least one concave reflective surface.

The at least one light-absorbing member may include one of a polymer including a first black dye, an oxidized metal film including a second black dye, and a solar cell. A size of the at least one light-absorbing member affects a viewing angle of the reflective display device. A ratio of a size of the at least one light-absorbing member to a size of the at least one concave reflective surface is between about 1% and about 50%.

The reflective plate may include at least one metal. In this case, the reflective plate and the first electrode may be integrally formed. Also, the reflective plate may include a polymer layer having at least one concave surface, and a metal thin film on the polymer layer. In this case, the metal thin film and the first electrode may be integrally formed.

The second electrode may include a transparent conductive material.

The reflective plate may be on a first substrate, and the second electrode may be on a second substrate. Here, the at least one light-absorbing member may be on the second electrode. Also, the at least one light-absorbing member may be arranged on the second substrate, and in this case, the second electrode may be on the second substrate so as to cover the at least one light-absorbing member.

According to example embodiments, a reflective display device includes a plurality of pixel units. Each of the plurality of pixel units includes a plurality of sub-pixels having different colors, a plurality of reflective plates each having one or more concave reflective surface, a plurality of first electrodes on the plurality of reflective plates, a plurality of second electrodes separate from the plurality of first electrodes, a plurality of light-absorbing members corresponding to the one or more concave reflective surfaces, and a plurality of color filter layers having different colors and corresponding to the plurality of sub-pixels. The plurality of light-absorbing members may be at focus positions of the one or more concave reflective surfaces. The polymer-dispersed liquid crystal (PDLC) layer may be between the plurality of first electrodes and the plurality of second electrodes. The polymer-dispersed liquid crystal (PDLC) layer may include a polymer and liquid crystals.

The plurality of first electrodes and the plurality of second electrodes may cross each other in a stripe pattern. Also, the plurality of first electrodes may correspond to the plurality of sub-pixels, and the plurality of second electrodes may be integrally formed as a common electrode.

The plurality of color filter layers may be on the plurality of reflective plates, or the plurality of color filter layers may be on the plurality of second electrodes.

The plurality of color filter layers may include red, green, and blue color filter layers, or include cyan, magenta, and yellow color filter layers.

BRIEF DESCRIPTION OF THE DRAWINGS

These and/or other features and advantages of example embodiments will become apparent and more readily appreciated from the following description of non-limiting embodiments, as illustrated in the accompanying drawings in which like reference characters refer to the same parts throughout the different views. The drawings are not necessarily to scale, emphasis instead being placed upon illustrating the principles of example embodiments. In the drawings.

DETAILED DESCRIPTION

Figure 1:
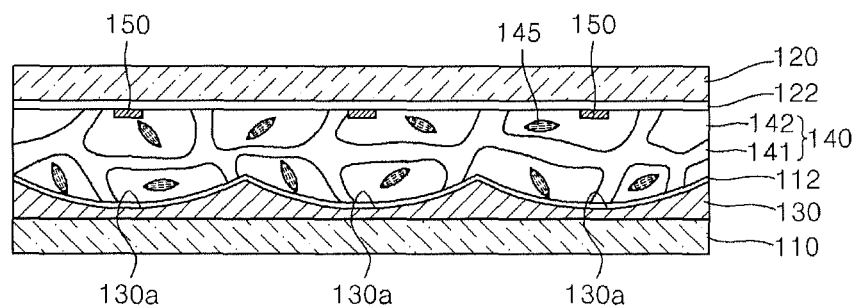
FIG. 1 is a cross-sectional view of a reflective display device according to example embodiments.

Example embodiments will now be described more fully with reference to the accompanying drawings, in which some example embodiments are shown. Example embodiments, may, however, be embodied in many different forms and should not be construed as being limited to the embodiments set forth herein; rather, these example embodiments are provided so that this disclosure will be thorough and complete, and will fully convey concepts of example embodiments to those of ordinary skill in the art. In the drawings, the thicknesses of layers and regions are exaggerated for clarity. Like reference numerals in the drawings denote like elements, and thus their description will be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Figure 2:
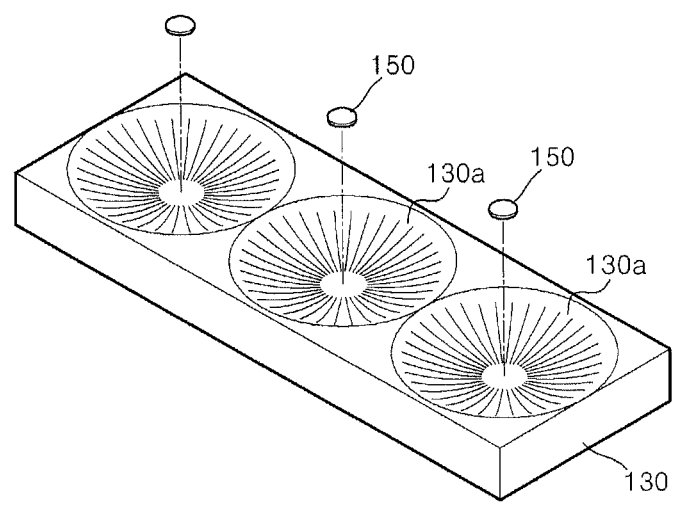
FIG. 2 is a perspective view illustrating a reflective plate and light-absorbing members of FIG. 1.

FIG. 1 is a cross-sectional view of a reflective display device according to example embodiments. The reflective display device according to example embodiments includes a plurality of pixel units. For convenience, FIG. 1 illustrates only one pixel unit of the plurality of pixel units, and this is the same in the following drawings. FIG. 2 is a perspective view illustrating a reflective plate 130 and at least one light-absorbing member 150 of FIG. 1.

Referring to FIGS. 1 and 2, a first substrate 110 and a second substrate 120 are separated by a desired (or alternatively predetermined) distance.

The first substrate 110, which is a lower substrate, may be formed using one of various materials. The second substrate 120, which is an upper substrate, may be a transparent substrate such as a glass substrate or a plastic substrate.

The reflective plate 130 that reflects incident light is arranged on a top surface of the first substrate 110. Here, the reflective plate 130 may have at least one concave reflective surface 130a. FIGS. 1 and 2 correspond to a case in which the reflective plate 130 has three concave reflective surfaces 130a. However, example embodiments are not limited thereto and the reflective plate 130 may have one or more concave reflective surfaces 130a. A concave reflective surface 130a may have an elliptic paraboloid shape. Other than this shape, the concave reflective surface 130a may have a half-spherical shape. Here, the half-spherical shape includes an exact half-spherical shape and a curved-surface shape that is similar to the half-spherical shape. The concave reflective surface 130a may have one of various concave shapes other than the elliptic paraboloid shape or the half-spherical shape. The reflective plate 130 may be formed of metal.

A first electrode 112 is formed on the reflective plate 130. Here, the first electrode 112 may be formed on a surface of the concave reflective surface 130a. The first electrode 112 may be formed of a transparent conductive material. In a case where the reflective plate 130 is formed of metal, the first electrode 112 and the reflective plate 130 may be integrally formed. In this case, the reflective plate 130 functions not only to reflect incident light from the concave reflective surface 130a but also functions as an electrode. Meanwhile, the first electrode 112 may be formed on a bottom surface of the reflective plate 130.

A second electrode 122 is formed on a bottom surface of the second substrate 120. The second electrode 122 may be formed of a transparent conductive material. In a case where the reflective display device according to example embodiments is an active matrix (AM) type display device, the first electrode 112 may be formed in a shape corresponding to a pixel unit, and the second electrode 122 may be formed as a common electrode. Here, a thin-film transistor (TFT) may be connected to the first electrode 112 so as to switch driving of the corresponding pixel unit. In a case where the reflective display device according to example embodiments is a passive matrix (PM) type display device, the first electrode 112 and the second electrode 122 may cross each other. For example, the first electrode 112 and the second electrode 122 may cross each other in a stripe pattern.

The at least one light-absorbing member 150 is arranged on a bottom surface of the second electrode 122. Here, the light-absorbing member 150 is arranged to correspond to the concave reflective surface 130a of the reflective plate 130. FIGS. 1 and 2 correspond to a case in which three light-absorbing members 150 are arranged to correspond to the three concave reflective surfaces 130a of the reflective plate 130. However, example embodiments are not limited thereto and thus the number of light-absorbing members 150 may vary so as to correspond to the number of concave reflective surfaces 130a. In example embodiment, the light-absorbing member 150 is arranged at a focus position of the concave reflective surface 130a of the reflective plate 130. As will be described below, the light-absorbing member 150 functions to absorb light incident on a focus of the concave reflective surface 130a. For example, the light-absorbing member 150 may include a polymer including black dye, or an oxidized metal film including black dye, but example embodiments are not limited thereto. The black dye of the polymer including black dye may be the same as or different than the black dye of the oxidized metal film including black dye. The light-absorbing member 150 may be formed as a solar cell that generates electric energy by absorbing incident light. In this case, the electric energy that is generated by a solar cell as the light-absorbing member 150 may contribute to driving the reflective display device according to example embodiments. By adjusting a size of the light-absorbing member 150, a viewing angle may be adjusted to a desired range. The size of the light-absorbing member 150 may be between about 1% and about 50% of the size of the concave reflective surface 130a.

A polymer-dispersed liquid crystal (PDLC) layer 140 is arranged between the first electrode 112 and the second electrode 122. The PDLC layer 140 includes a polymer 141 and liquid crystals 142. The polymer 141 has a network structure, and the liquid crystals 142 are uniformly distributed in the polymer 141. When an electric field is not applied to the PDLC layer 140, as illustrated in FIG. 1, liquid crystal molecules 145 are randomly oriented in the PDLC layer 140. In this manner, in a state in which the liquid crystal molecules 145 are randomly oriented, light incident on the PDLC layer 140 is scattered due to a difference between a refractive index of the polymer 141 and a refractive index of the liquid crystals 142. After an electric field is applied to the PDLC layer 140, as illustrated in FIG. 4B that will be described below, the liquid crystal molecules 145 are arrayed in parallel with the electric field in the PDLC layer 140. In a state in which the liquid crystal molecules 145 are arrayed in parallel with the electric field, the refractive index of the polymer 141 and the refractive index of the liquid crystals 142 are equal, so that light incident on the PDLC layer 140 passes through the PDLC layer 140.

Figure 3:
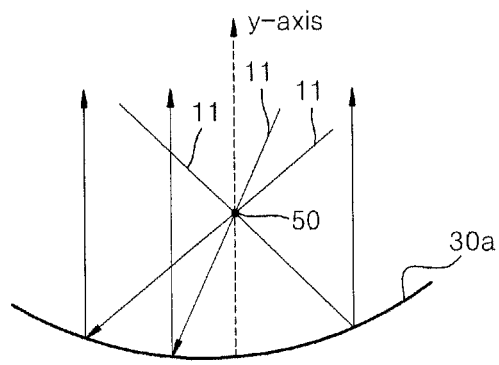
FIG. 3 is a diagram for describing a principle related to light reflection on a parabolic surface.

FIG. 3 is a diagram for describing a principle related to light reflection on a parabolic surface 30a. Referring to FIG. 3, light 11 that is incident on the parabolic surface 30a after passing through a focus 50 of the parabolic surface 30a is reflected in a direction parallel with a Y-axis. Thus, when the light 11 toward the focus 50 of the parabolic surface 30a is absorbed at the focus 50 of the parabolic surface 30a, no light is reflected in the direction parallel with the Y-axis. The reflective display device according to example embodiments displays an image by using the light reflection principle on a parabolic surface.

Figure 4A:
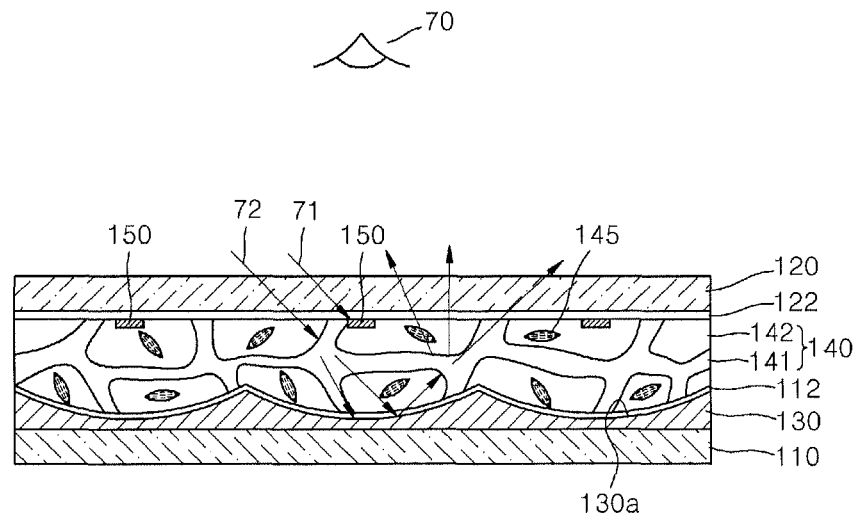
FIGS. 4A and 4B are diagrams for describing an operation process of the reflective display device of FIG. 1.
Figure 4B:
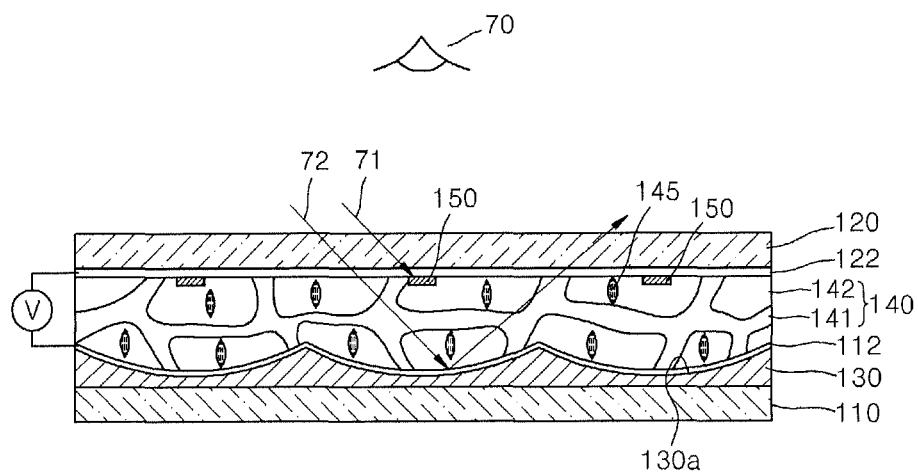

FIGS. 4A and 4B are diagrams for describing an operation process of the reflective display device of FIG. 1. In more detail, FIG. 4A illustrates a state in which a voltage is not applied to the PDLC layer 140 in the reflective display device. FIG. 4B illustrates a state in which a desired (or alternatively predetermined) voltage V is applied to the PDLC layer 140 in the reflective display device.

First, referring to FIG. 4A, in a state in which a voltage is not applied to the PDLC layer 140 of a desired (or alternatively predetermined) pixel unit, the liquid crystal molecules 145 are randomly oriented. While the liquid crystal molecules 145 are randomly oriented, light 71 that is incident from a light source (e.g., the sun) to a light-absorbing member 150 is absorbed by the light-absorbing member 150. This is because the light-absorbing member 150 is arranged at a focus position of the concave reflective surface 130a of the reflective plate 130, as described above. Also, light 72 that is incident from the light source to the PDLC layer 140, not the light-absorbing member 150, is scattered in the PDLC layer 140 due to a difference between a refractive index of the polymer 141 and a refractive index of the liquid crystals 142. The scattered light is reflected on the concave reflective surface 130a of the reflective plate 130, and the reflected light is scattered again in the PDLC layer 140 and then is emitted in various directions after passing through the second substrate 120. The light that has passed through the second substrate 120 reaches a viewer 70 above the pixel unit, so that the viewer 70 may see the pixel unit as white. The PDLC layer 140 has an excellent feature of scattering and transmitting light, so that the reflective display device may have improved reflectance.

Next, referring to FIG. 4B, in a state in which the desired (or alternatively predetermined) voltage V is applied to the PDLC layer 140 of the pixel unit, the liquid crystal molecules 145 are arrayed in parallel with an electric field. While the liquid crystal molecules 145 are arrayed in parallel with the electric field, the light 71 that is incident from the light source to the light-absorbing member 150 is absorbed by the light-absorbing member 150. Also, the light 72 that is incident from the light source to the PDLC layer 140, not the light-absorbing member 150, passes through the PDLC layer 140 due to the fact that the refractive index of the polymer 141 and the refractive index of the liquid crystals 142 become equal, and the transmitted light is reflected at a desired (or alternatively predetermined) angle on the concave reflective surface 130a of the reflective plate 130 and then is emitted after passing through the second substrate 120. In this method, the light-absorbing member 150 absorbs light incident on the focus position of the concave reflective surface 130a, so that no light is reflected from the concave reflective surface 130a toward the viewer 70 above the pixel unit. Thus, the viewer 70 sees the pixel unit as black. Here, by varying the size of the light-absorbing member 150 arranged at the focus position of the concave reflective surface 130a, a viewing angle of the reflective display device may be adjusted. In more detail, as the size of the light-absorbing member 150 is increased, the size of an area in which the pixel unit is seen as black is also increased, so that the viewing angle becomes wide. Accordingly, the viewer 70 located within the viewing angle may further clearly see the pixel unit as black, so that visibility of the reflective display device may be improved.

Figure 5:
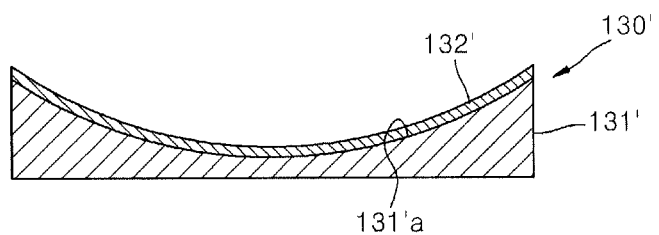
FIG. 5 illustrates a reflective plate that may be applied to the reflective display device of FIG. 1, according to example embodiments.

FIG. 5 illustrates a reflective plate 130' that may be applied to the reflective display device of FIG. 1, according to example embodiments. Referring to FIG. 5, the reflective plate 130' may include a polymer layer 131' having at least one concave surface 131'a, and a metal thin film 132' coated on the concave surface 131'a of the polymer layer 131'. The concave surface 131'a of the polymer layer 131' may have the same shape as the concave reflective surface 130a. Here, the metal thin film 132' and the first electrode 112 (as shown in FIG. 1) may be integrally formed. In this case, the metal thin film 132' functions not only to reflect incident light but also functions as an electrode. In FIG. 5, the polymer layer 131' includes one concave surface 131'a, for convenience of explanation. However, the polymer layer 131' may have one or more concave surfaces 131'a.

Figure 6:
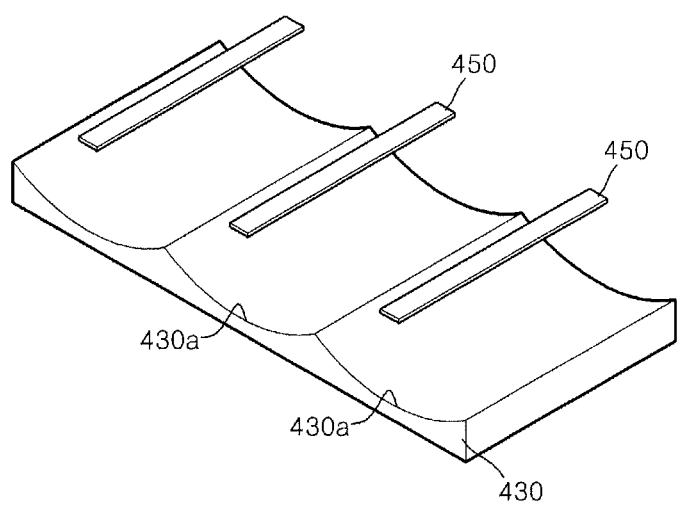
FIG. 6 illustrates a reflective plate and light-absorbing members that may be applied to the reflective display device of FIG. 1, according to example embodiments.

FIG. 6 illustrates a reflective plate 430 and a light absorbing member 450 that may be applied to the reflective display device of FIG. 1, according to example embodiments. Referring to FIG. 6, a concave reflective surface 430a of the reflective plate 430 may have a half-cylindrical shape. In this case, the light-absorbing member 450 may be arranged at a focus position of the concave reflective surface 430a in parallel with the concave reflective surface 430a.

Figure 7:
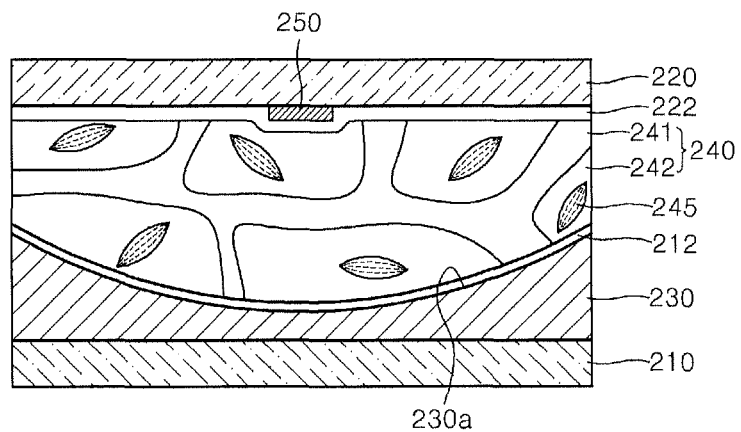
FIG. 7 illustrates a reflective display device according to example embodiments.

FIG. 7 illustrates a reflective display device according to example embodiments. In the reflective display device of FIG. 7, a reflective plate 230 has one concave reflective surface 230a, for convenience of explanation. Hereinafter, the reflective display device of FIG. 7 will be described.

Referring to FIG. 7, a first substrate 210 and a second substrate 220 are separated by a desired (or alternatively predetermined) distance. The reflective plate 230 having at least one concave reflective surface 230a is provided on a top surface of the first substrate 210, and a first electrode 212 is formed on a top surface of the concave reflective surface 230a. Here, as described above, the concave reflective surface 230a of the reflective plate 230 may have an elliptic paraboloid shape, a half-spherical shape, or a half-cylindrical shape. The reflective plate 230 may be formed of metal. The first electrode 212 may be formed of a transparent conductive material. In a case where the reflective plate 230 is formed of metal, the first electrode 212 and the reflective plate 230 may be integrally formed. As illustrated in FIG. 5, the reflective plate 230 may include a polymer layer 131' having at least one concave surface 131'a, and a metal thin film 132' formed on the polymer layer 131'. In this case, the metal thin film 132' and the first electrode 212 may be integrally formed. Alternatively, the first electrode 212 may be formed on a bottom surface of the reflective plate 230.

A light-absorbing member 250 is arranged on a bottom surface of the second electrode 220. Here, the light-absorbing member 250 is arranged to correspond to the concave reflective surface 230a of the reflective plate 230. In more detail, the light-absorbing member 250 is arranged at a focus position of the concave reflective surface 230a. The light-absorbing member 250 may have one of various shapes according to a shape of the concave reflective surface 230a. For example, in a case where the concave reflective surface 230a has the elliptic paraboloid shape or the half-spherical shape, the light-absorbing member 250 may have a shape shown in FIG. 2, and in a case where the concave reflective surface 230a has the half-cylindrical shape, the light-absorbing member 250 may have a shape shown in FIG. 6. For example, the light-absorbing member 250 may include a polymer including black dye, or an oxidized metal film including black dye, but example embodiments are not limited thereto. The light-absorbing member 250 may be formed as a solar cell that generates electric energy by absorbing incident light. The size of the light-absorbing member 250 may be between about 1% and about 50% of the size of the concave reflective surface 230a.

A second electrode 222 is formed on the bottom surface of the second substrate 220 so as to cover the light-absorbing member 250. The second electrode 222 may be formed of a transparent conductive material such as indium tin oxide (ITO). A PDLC layer 240 is arranged between the first electrode 212 and the second electrode 222. The PDLC layer 240 includes a polymer 241 and liquid crystals 242. The polymer 241 has a network structure, and the liquid crystals 242 are uniformly distributed in the polymer 241. Liquid crystal molecules 245 constitute the liquid crystals 242.

Figure 8:
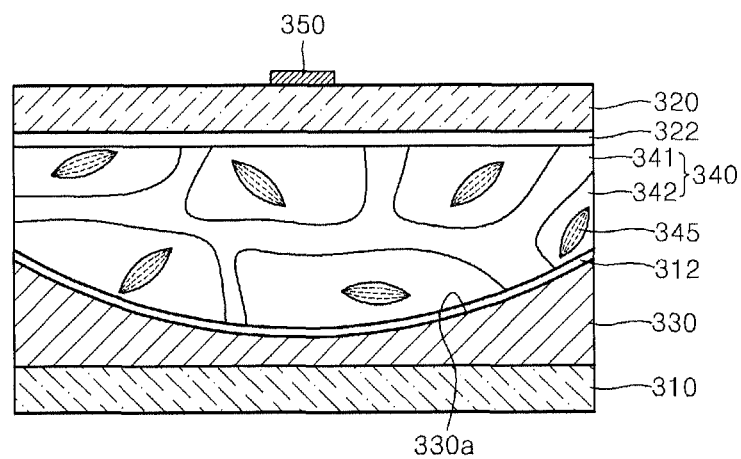
FIG. 8 illustrates a reflective display device according to example embodiments.

FIG. 8 illustrates a reflective display device according to example embodiments.

In the reflective display device of FIG. 8, for convenience, a reflective plate 330 has one concave reflective surface 330a. Hereinafter, the reflective display device of FIG. 8 will be described.

Referring to FIG. 8, a first substrate 310 and a second substrate 320 are separated by a desired (or alternatively predetermined) distance. The reflective plate 330 having at least one concave reflective surface 330a is provided on a top surface of the first substrate 310, and a first electrode 312 is formed on a top surface of the concave reflective surface 330a. Here, the concave reflective surface 330a of the reflective plate 330 may have a elliptic paraboloid shape, a half-spherical shape, or a half-cylindrical shape. The reflective plate 330 may be formed of metal. The first electrode 312 may be formed of a transparent conductive material. In a case where the reflective plate 330 is formed of metal, the first electrode 312 and the reflective plate 330 may be integrally formed. As illustrated in FIG. 5, the reflective plate 330 may include a polymer layer 131' having at least one concave surface 131'a, and a metal thin film 132' formed on the polymer layer 131'. In this case, the metal thin film 132' and the first electrode 312 may be integrally formed. Alternatively, the first electrode 312 may be formed on a bottom surface of the reflective plate 330.

A light-absorbing member 350 is arranged on a top surface of the second electrode 320. Here, the light-absorbing member 350 is arranged to correspond to the concave reflective surface 330a of the reflective plate 330. In more detail, the light-absorbing member 350 is arranged at a focus position of the concave reflective surface 330a. For example, the light-absorbing member 350 may include a polymer including black dye, an oxidized metal film including black dye, or a solar cell. The size of the light-absorbing member 350 may be between about 1% and about 50% of the size of the concave reflective surface 330a. A second electrode 322 is formed on a bottom surface of the second substrate 320. The second electrode 322 may be formed of a transparent conductive material such as ITO. A PDLC layer 340, including a polymer 341 and liquid crystals 342, is arranged between the first electrode 312 and the second electrode 322. Liquid crystal molecules 345 constitute the liquid crystals 342.

Figure 9:
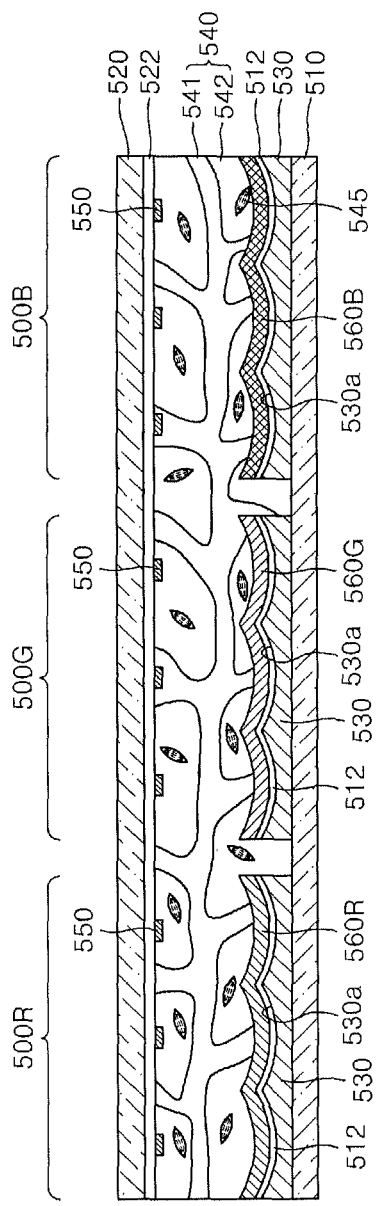
FIG. 9 illustrates a reflective color display device according to example embodiments.

FIG. 9 illustrates a reflective color display device according to example embodiments. The reflective color display device according to example embodiments includes a plurality of pixel units, each of which includes a plurality of sub-pixels having different colors. For convenience, FIG. 9 illustrates only one pixel unit of the plurality of pixel units. In example embodiment, the pixel unit is formed of red, green, and blue sub-pixels 500R, 500G, and 500B. However, example embodiments are not limited thereto, and the pixel unit may be formed of cyan, magenta, and yellow sub-pixels or may be formed of sub-pixels having various colors. Hereinafter, the reflective color display device of FIG. 9 will be described.

Referring to FIG. 9, a first substrate 510 and a second substrate 520 are separated by a desired (or alternatively predetermined) distance. The first substrate 510, which is a lower substrate, may be formed using one of various materials. The second substrate 520, which is an upper substrate, may be a transparent substrate such as a glass substrate or a plastic substrate.

A plurality of reflective plates 530 are arranged on a top surface of the first substrate 510, each of which may have at least one concave reflective surface 530a. In the reflective color display device of FIG. 9, each of the plurality of reflective plates 530 has three concave reflective surfaces 530a. The concave reflective surface 530a may have an elliptic paraboloid shape or a half-spherical shape. Also, as illustrated in FIG. 6, the concave reflective surface 530a may have a half-cylindrical shape or may have one of various concave shapes. The reflective plates 530 may be formed of metal.

A plurality of first electrodes 512 are formed on the reflective plates 530, respectively. Here, the first electrodes 512 may be formed on top surfaces of the concave reflective surfaces 530a. The first electrode 512 may be formed of a transparent conductive material. In a case where the reflective plates 530 are formed of metal, the first electrodes 512 and the reflective plates 530 may be integrally formed. As illustrated in FIG. 5, each of the reflective plates 530 may include a polymer layer 131' having at least one concave surface 131'a, and a metal thin film 132' formed on the polymer layer 131'. In this case, the metal thin film 132' and the first electrode 512 may be integrally formed. Alternatively, the first electrodes 512 may be formed on bottom surfaces of the reflective plates 530.

A plurality of color filter layers 560R, 560G, and 560B having different colors may be arranged on the first electrodes 512. Here, the color filter layers 560R, 560G, and 560B correspond to sub-pixels 500R, 500G, and 500B, and for example, the color filter layers 560R, 560G, and 560B may be formed as red, green, and blue color filter layers 560R, 560G, and 560B. However, the color filter layers 560R, 560G, and 560B are not limited thereto and may be formed as cyan, magenta, and yellow color filter layers or may be formed as color filter layers having various colors.

A plurality of second electrodes 522 are formed on a bottom surface of the second substrate 520. The second electrodes 522 may be formed of a transparent conductive material. In a case where the reflective color display device according to example embodiments is an AM type display device, the first electrodes 512 may correspond to the sub-pixels 500R, 500G, and 500B, and the second electrodes 522 may be integrally formed as a common electrode. Here, a TFT may be connected to each of the first electrodes 512 so as to switch driving of the corresponding pixel unit. In a case where the reflective color display device according to example embodiments is a PM type display device, the first electrodes 512 and the second electrodes 522 may cross each other. For example, the first electrodes 512 and the second electrodes 522 may cross each other in a stripe pattern.

A plurality of light-absorbing members 550 are arranged on a bottom surface of the second electrodes 522. Here, the light-absorbing members 550 are arranged to correspond to the concave reflective surfaces 530a of the reflective plates 530. The light-absorbing members 550 are arranged at focus positions of the concave reflective surfaces 530a. As described above, the light-absorbing members 550 function to absorb light incident on focuses of the concave reflective surfaces 530a. The light-absorbing member 550 may have one of various shapes according to a shape of the concave reflective surface 530a. For example, in a case where the concave reflective surface 530a has an elliptic paraboloid shape or a half-spherical shape, the light-absorbing member 550 may have a shape shown in FIG. 2, and in a case where the concave reflective surface 530a has a half-cylindrical shape, the light-absorbing member 550 may have a shape shown in FIG. 6. The light-absorbing member 550 may include a polymer including black dye, or an oxidized metal film including black dye, but example embodiments are not limited thereto. The light-absorbing member 550 may be formed as a solar cell that generates electric energy by absorbing incident light. By adjusting the size of the light-absorbing member 550, a viewing angle may be adjusted to a desired range. The size of the light-absorbing member 550 may be between about 1% and about 50% of the size of the concave reflective surface 530a. A PDLC layer 540, including a polymer 541 and liquid crystals 542, is arranged between the first electrodes 512 and the second electrodes 522. Liquid crystal molecules 545 constitute the liquid crystals 542.

The reflective color display device according to example embodiments operates the same as the reflective display device of FIG. 1, except that in the reflective color display device according to example embodiments the color filter layers 560R, 560G, and 560B are arranged on the reflective plates 530 so that a color image is realized. Thus, the detailed descriptions regarding the operational processes of the reflective color display device according to example embodiments are omitted.

In the reflective color display device of FIG. 9, the second electrodes 522 are formed on the bottom surface of the second substrate 520, and the light-absorbing members 550 are formed on bottom surfaces of the second electrodes 522.

However, the light-absorbing members 550 may be arranged on the bottom surface of the second substrate 520, and the second electrodes 522 are formed on the bottom surface of the second substrate 520 so as to cover the light-absorbing members 550. Also, the light-absorbing members 550 may be formed on a top surface of the second substrate 520, and the second electrodes 522 are formed on the bottom surface of the second substrate 520.

Figure 10:
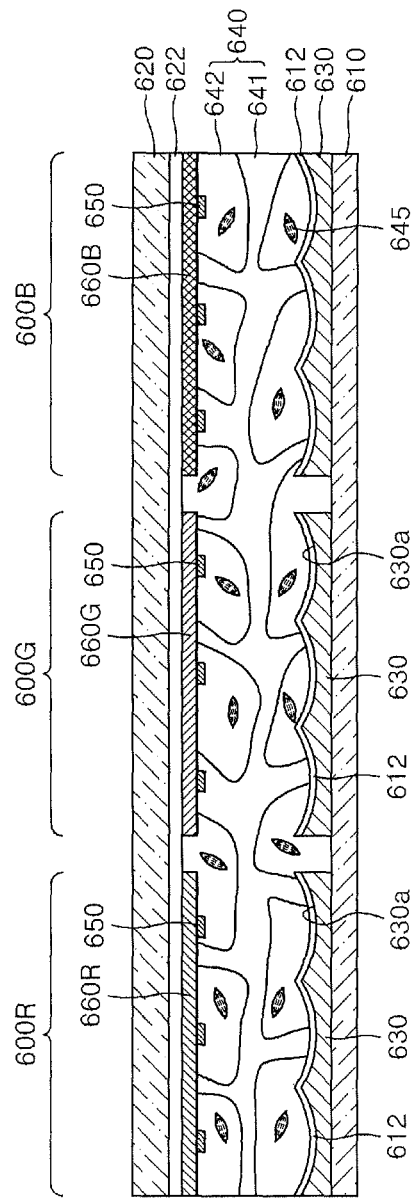
FIG. 10 illustrates a reflective color display device according to example embodiments.

FIG. 10 illustrates a reflective color display device according to example embodiments. The reflective color display device according to example embodiments includes a plurality of pixel units, each of which includes a plurality of sub-pixels having different colors. For convenience, FIG. 10 illustrates only one pixel unit of the plurality of pixel units. In example embodiment, the pixel unit is formed of red, green, and blue sub-pixels 600R, 600G, and 600B. However, example embodiments are not limited thereto and thus the pixel unit may be formed of cyan, magenta, and yellow sub-pixels or may be formed of sub-pixels having various colors. Hereinafter, the reflective color display device of FIG. 10 will be described.

Referring to FIG. 10, a first substrate 610 and a second substrate 620 are separated by a desired (or alternatively predetermined) distance. A plurality of reflective plates 630 are arranged on a top surface of the first substrate 610, and each of the plurality of reflective plates 630 may have at least one concave reflective surface 630a. In the reflective color display device of FIG. 10, each of the plurality of reflective plates 630 has three concave reflective surfaces 630a. The concave reflective surface 630a may have an elliptic paraboloid shape or a half-spherical shape. Also, as illustrated in FIG. 6, the concave reflective surface 630a may have a half-cylindrical shape or may have one of various concave shapes. The reflective plates 630 may be formed of metal.

A plurality of first electrodes 612 are formed on the reflective plates 630, respectively. Here, the first electrodes 612 may be formed on a top surface of the concave reflective surfaces 630a. The first electrode 612 may be formed of a transparent conductive material. In a case where the reflective plates 630 are formed of metal, the first electrodes 612 and the reflective plates 630 may be integrally formed. As illustrated in FIG. 5, each of the reflective plates 630 may include a polymer layer 131' having at least one concave surface 131'a, and a metal thin film 132' formed on the polymer layer 131'. In this case, the metal thin film 132' and the first electrode 512 may be integrally formed. Alternatively, the first electrodes 612 may be formed on bottom surfaces of the reflective plates 630.

A plurality of second electrodes 622 are formed on a bottom surface of the second substrate 620. The second electrodes 622 may be formed of a transparent conductive material. A plurality of color filter layers 660R, 660G, and 660B having different colors may be arranged on bottom surfaces of the second electrodes 622. Here, the color filter layers 660R, 660G, and 660B correspond to the sub-pixels 600R, 600G, and 600B, and for example, the color filter layers 660R, 660G, and 660B may be formed as red, green, and blue color filter layers 660R, 660G, and 660B. However, the color filter layers 660R, 660G, and 660B are not limited thereto and thus may be formed as cyan, magenta, and yellow color filter layers or may be formed as color filter layers having various colors. A plurality of light-absorbing members 650 are arranged on bottom surfaces of the color filter layers 660R, 660G, and 660B. Here, the light-absorbing members 650 are arranged to correspond to the concave reflective surfaces 630a of the reflective plates 630. The light-absorbing members 650 are arranged at focus positions of the concave reflective surfaces 630a. The light-absorbing member 650 may have one of various shapes according to a shape of the concave reflective surface 630a. For example, the light-absorbing member 650 may include black dye. By adjusting the size of the light-absorbing member 650, a viewing angle may be adjusted to a desired range. The size of the light-absorbing member 650 may be between about 1% and about 50% of the size of the concave reflective surface 630a. A PDLC layer 640, including a polymer 641 and liquid crystals 642, is arranged between the first electrodes 612 and the second electrodes 622. Liquid crystal molecules 645 constitute the liquid crystals 642.

The reflective color display device according to example embodiments operates the same as the reflective color display device of FIG. 9, except that in the reflective color display device according to example embodiments the color filter layers 660R, 660G, and 660B are arranged on the bottom surfaces of the second electrodes 622 so that a color image is realized. Thus, the detailed descriptions regarding the operational processes of the reflective color display device according to example embodiments are omitted.

In the reflective color display device of FIG. 10, the second electrodes 622 are formed on the bottom surface of the second substrate 620, the color filter layers 660R, 660G, and 660B are arranged on the bottom surfaces of the second electrodes 622, and the light-absorbing members 650 are arranged on the bottom surfaces of the color filter layers 660R, 660G, and 660B. However, that the light-absorbing members 650 may be arranged on the bottom surfaces of the second electrodes 622, and the color filter layers 660R, 660G, and 660B are formed on the bottom surfaces of the second electrodes 622 so as to cover the light-absorbing members 650. Also, the color filter layers 660R, 660G, and 660B may be formed on the bottom surface of the second substrate 620, the light-absorbing members 650 are arranged on the bottom surfaces of the color filter layers 660R, 660G, and 660B, and the second electrodes 622 are arranged to cover the light-absorbing members 650. Also, the light-absorbing members 650 may be arranged on the top surface of the second substrate 620, the second electrodes 622 are formed on the bottom surface of the second substrate 620, and the color filter layers 660R, 660G, and 660B are formed on the bottom surfaces of the second electrodes 622.

According to example embodiments, a reflective display device may be implemented by disposing a light-absorbing member at a focus position of a concave reflective surface of a reflective plate and by arranging a PDLC layer between the light-absorbing member and the reflective plate.

It should be understood that example embodiments described herein should be considered in a descriptive sense only and not for purposes of limitation. While some example embodiments have been particularly shown and described, it will be understood by one of ordinary skill in the art that variations in form and detail may be made therein without departing from the spirit and scope of the claims. Descriptions of features or aspects within some example embodiments should typically be considered as available for other similar features or aspects in other example embodiments.

What is claimed is:

1. A reflective display device comprising a plurality of pixel units, each of the plurality of pixel units including:
    a reflective plate including at least one concave reflective surface;
    a first electrode on the reflective plate;
    a second electrode separate from the first electrode;
    at least one light-absorbing member, the light-absorbing member corresponding to the at least one concave reflective surface, the light-absorbing member being at a focus position of the at least one concave reflective surface; and a polymer-dispersed liquid crystal (PDLC) layer between the first electrode and the second electrode, the polymer-dispersed liquid crystal (PDLC) layer including a polymer and liquid crystals.

2. The reflective display device of claim 1, wherein the at least one concave reflective surface includes one of an elliptic paraboloid shape and a half-spherical shape.

3. The reflective display device of claim 1, wherein the at least one concave reflective surface includes a half-cylindrical shape, and the at least one light-absorbing member is parallel with the at least one concave reflective surface at the focus position of the at least one concave reflective surface.

4. The reflective display device of claim 1, wherein the at least one light-absorbing member includes one of:

a polymer including a first black dye, an oxidized metal film including a second black dye, and a solar cell.

5. The reflective display device of claim 1, wherein a size of the at least one light-absorbing member affects a viewing angle of the reflective display device.

6. The reflective display device of claim 1, wherein a ratio of a size of the at least one light-absorbing member to a size of the at least one concave reflective surface is between about 1% and about 50%.

7. The reflective display device of claim 1, wherein the reflective plate includes a metal.

8. The reflective display device of claim 7, wherein the reflective plate and the first electrode are integrally formed.

9. The reflective display device of claim 1, wherein the reflective plate includes:

a polymer layer having at least one concave surface, and a metal thin film on the polymer layer.

10. The reflective display device of claim 9, wherein the metal thin film and the first electrode are integrally formed.

11. The reflective display device of claim 1, wherein the second electrode includes a transparent conductive material.

12. The reflective display device of claim 11, wherein the at least one light-absorbing member is on the second substrate.

13. The reflective display device of claim 12, wherein the second electrode is on the second substrate, and the second electrode covers the at least one light-absorbing member.

14. The reflective display device of claim 1, wherein the reflective plate is on a first substrate, and the second electrode is on a second substrate.

15. The reflective display device of claim 14, wherein the at least one light-absorbing member is on the second electrode.

16. A reflective display device comprising a plurality of pixel units, each of the plurality of pixel units including:

a plurality of sub-pixels having different colors;

a plurality of reflective plates each having one or more concave reflective surface;

a plurality of first electrodes on the plurality of reflective plates;

a plurality of second electrodes separate from the plurality of first electrodes;

a plurality of light-absorbing members corresponding to the one or more concave reflective surface, the plurality of light-absorbing members being at focus positions of the one or more concave reflective surface;

a polymer-dispersed liquid crystal (PDLC) layer between the plurality of first electrodes and the plurality of second electrodes, the polymer-dispersed liquid crystal (PDLC) layer including a polymer and a plurality of liquid crystals; and a plurality of color filter layers having different colors, each of the color filter layers corresponding to the plurality of sub-pixels.

17. The reflective display device of claim 16, wherein each of the one or more concave reflective surface includes one of:

an elliptic paraboloid shape, a half-spherical shape, and a half-cylindrical shape.

18. The reflective display device of claim 16, wherein each of the plurality of light-absorbing members includes one of:

a polymer including a first black dye, an oxidized metal film including a second black dye, and a solar cell.

19. The reflective display device of claim 16, wherein a ratio of a size of each of the plurality of light-absorbing members to a size each of the one or more concave reflective surface is between about 1% and about 50%.

20. The reflective display device of claim 16, wherein each of the plurality of reflective plates includes a metal.

21. The reflective display device of claim 20, wherein each of the plurality of reflective plates and each of the plurality of first electrodes are integrally formed.

22. The reflective display device of claim 16, wherein each of the plurality of reflective plates includes:

a polymer layer having at least one concave surface, and a metal thin film on the polymer layer.

23. The reflective display device of claim 22, wherein the metal thin film and the plurality of first electrodes are integrally formed.

24. The reflective display device of claim 16, wherein the plurality of first electrodes and the plurality of second electrodes cross each other in a stripe pattern.

25. The reflective display device of claim 16, wherein the plurality of first electrodes correspond to the plurality of sub-pixels, and the plurality of second electrodes are integrally formed as a common electrode.

26. The reflective display device of claim 16, wherein the plurality of color filter layers are on the plurality of reflective plates.

27. The reflective display device of claim 16, wherein the plurality of color filter layers are on the plurality of second electrodes.

28. The reflective display device of claim 16, wherein the plurality of color filter layers include one of:

red, green, and blue color filter layers, and cyan, magenta, and yellow color filter layers.

29. The reflective display device of claim 16, wherein the plurality of reflective plates are on a first substrate, and the plurality of second electrodes are on a second substrate.

30. The reflective display device of claim 29, wherein the plurality of light-absorbing members are on the plurality of second electrodes.

31. The reflective display device of claim 29, wherein the plurality of light-absorbing members are on the second substrate.

32. The reflective display device of claim 31, wherein the plurality of second electrodes are on the second substrate so as to cover the plurality of light-absorbing members.

* * * * *